(12) United States Patent (10) Patent No.: US 12,643,738 B2
Omae (45) Date of Patent: Jun. 2, 2026

(54) PICKING SYSTEM

(71) Applicant: MURATA MACHINERY, LTD., Kyoto (JP)

(72) Inventor: Takeshi Omae, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 298 days.

(21) Appl. No.: 18/289,273

(22) PCT Filed: May 23, 2022

(86) PCT No.: PCT/JP2022/021077
§ 371 (c)(1),
(2) Date: Nov. 2, 2023

(87) PCT Pub. No.: WO2023/276490
PCT Pub. Date: Jan. 5, 2023

(65) Prior Publication Data
US 2025/0340374 A1 Nov. 6, 2025

(30) Foreign Application Priority Data
Jun. 29, 2021 (JP) ................................. 2021-107618

(51) Int. Cl.
B65G 1/04 (2006.01)
B65G 1/06 (2006.01)

(52) U.S. Cl.
CPC ......... B65G 1/0485 (2013.01); B65G 1/0492 (2013.01); B65G 1/065 (2013.01)

(58) Field of Classification Search
CPC ..................................................... B65G 1/065
See application file for complete search history.

(56) References Cited

U.S. PATENT DOCUMENTS

| | | | | | |
|---|---|---|---|---|---|
| 5,002,449 | A | * | 3/1991 | Kita | B65G 1/0492 414/280 |
| 6,149,366 | A | * | 11/2000 | Deandrea | B65G 1/0414 414/279 |

(Continued)

FOREIGN PATENT DOCUMENTS

| | | |
|---|---|---|
| JP | 05-17009 A | 1/1993 |
| JP | 10-273204 A | 10/1998 |

(Continued)

OTHER PUBLICATIONS

Official Communication issued in International Patent Application No. PCT/JP2022/021077, mailed on Jan. 4, 2024.

(Continued)

*Primary Examiner* — Jonathan Snelting
(74) *Attorney, Agent, or Firm* — Keating & Bennett, LLP

(57) ABSTRACT
A picking system includes a first rack including upper shelf tiers to store goods and a lower tier, a vertical conveyor to vertically convey the goods between the lower tier and one of the upper shelf tiers, a shuttle carriage adjacent to one of the upper shelf tiers and operable to travel along the shelf tier to store or retrieve the goods from the shelf tier, a picking station on or along the lower tier, and linear motor carriages adjacent to the lower tier and operable to travel along the lower tier so as to carry the goods into or out of the picking station.

4 Claims, 12 Drawing Sheets

(56) References Cited

U.S. PATENT DOCUMENTS

| 6,652,213 | B1 * | 11/2003 | Mitchell | B65G 1/0492 |
| | | | | 414/284 |
| 9,555,967 | B2 * | 1/2017 | Stevens | B65G 1/065 |
| 9,630,777 | B2 * | 4/2017 | Yamashita | B65G 1/1375 |
| 10,358,291 | B2 * | 7/2019 | Tai | B65G 1/0457 |
| 2011/0008137 | A1 | 1/2011 | Yamashita | |
| 2012/0328397 | A1 | 12/2012 | Yamashita | |
| 2020/0062506 | A1 | 2/2020 | Kakinuki | |
| 2020/0156871 | A1 * | 5/2020 | Fosnight | B65G 1/065 |

FOREIGN PATENT DOCUMENTS

| JP | 2001-270607 | A | 10/2001 |
| JP | 2018-154446 | A | 10/2018 |
| JP | 2020-029323 | A | 2/2020 |
| KR | 20110049894 | A | 5/2011 |
| WO | 2012/032866 | A1 | 3/2012 |

OTHER PUBLICATIONS

Official Communication issued in International Patent Application No. PCT/JP2022/021077, mailed on Jul. 5, 2022.

* cited by examiner

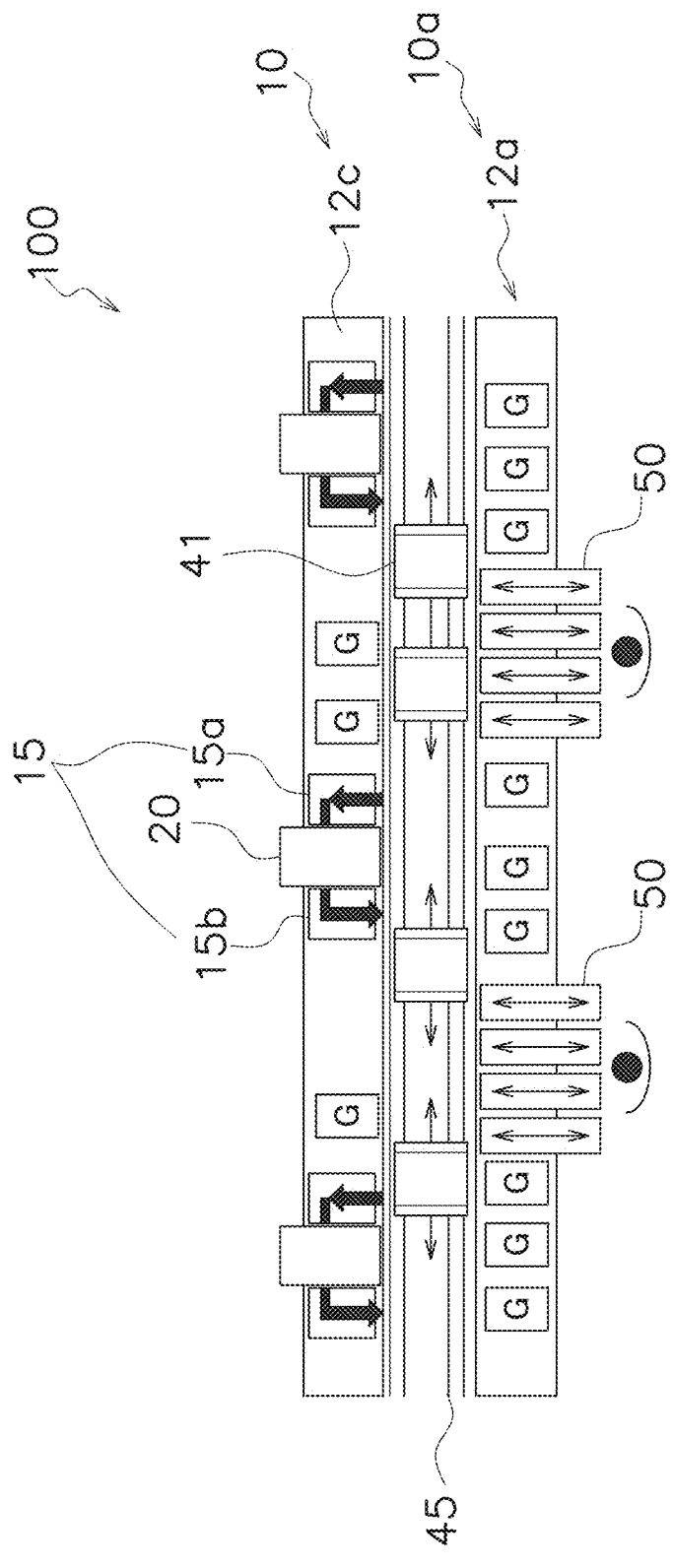
FIG. 3
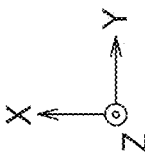

PICKING SYSTEM

BACKGROUND OF THE INVENTION

1. Field of the Invention

The present disclosure relates to a picking system for storing and retrieving goods between a rack and a picking station.

2. Description of the Related Art

There is known an automated warehouse including a carrier for carrying goods corresponding to each of a plurality of shelf tiers of a rack for storing goods. WO2012/032866 discloses use of a plurality of carriers disposed on a lower tier side to which a picking station is connected.

SUMMARY OF THE INVENTION

The lower tier side of the plurality of shelf tiers of the rack is connected the picking station, and hence it needs to carry a lot of goods. Therefore, if the carrier having the same ability as an upper tier side is used, the ability is insufficient and becomes a bottleneck in carrying goods, so that sufficient amount of goods cannot be carried.

Preferred embodiments of the present invention improve a speed of a carrier on a lower tier side, so that a lot of goods can be carried into or out of a picking station.

A plurality of preferred embodiments of the present invention are described below. These preferred embodiments can be arbitrarily combined as necessary.

A picking system according to a preferred embodiment of the present invention includes a first rack including a lower tier and a plurality of upper shelf tiers to store goods, a vertical conveyor to vertically convey the goods between the lower tier and one of the plurality of upper shelf tiers, a shuttle carriage adjacent to one of the upper shelf tiers and operable to travel along the shelf tier to store or retrieve the goods from the shelf tier, a picking station on or along the lower tier, and a plurality of linear motor carriages adjacent to the lower tier and operable to travel a path that is parallel or substantially parallel to that of the shuttle carriage along the lower tier so as to carry the goods into or out of the picking station.

Picking systems of preferred embodiments of the present invention can carry a lot of goods into or out of the picking station, because the high speed linear motor carriages are provided on the lower tier side where the picking station is located.

A picking system according to a preferred embodiment of the present disclosure further includes a second rack including a plurality of shelf tiers to store goods, and the second rack shares the vertical conveyor with the first rack.

The picking system including the second rack can carry a greater amount of goods to the picking station while reducing cost by sharing the vertical conveyor.

The linear motor carriage may be movable bidirectionally.

As the linear motor carriage is movable bidirectionally, a moving distance of the carriage can be reduced.

The picking system may further include a loop track for the linear motor carriage to travel, and the linear motor carriage may travel on the loop track in one direction.

As the linear motor carriage travels on the loop track unidirectionally, more carriages can be provided so that a carrying amount can be increased.

The picking system may further include a third rack including a plurality of shelf tiers to store goods, and a lower shelf tier among the plurality of shelf tiers of the third rack may be adjacent to the loop track.

Utilizing the loop track, goods of the rack at a distant position can be carried into or out of the picking station.

According to the picking systems of preferred embodiments of the present invention, the speed of the carrier of goods on the lower tier side can be improved, and a lot of goods can be carried from the rack to the picking station.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a schematic plan view of a lower shelf tier 12 of a rack of the picking system 100 of the first preferred embodiment of the present invention.

FIG. 6 is a schematic side view of a linear motor carriage device 40, 40a.

DETAILED DESCRIPTION OF THE PREFERRED EMBODIMENTS

Figure 1:
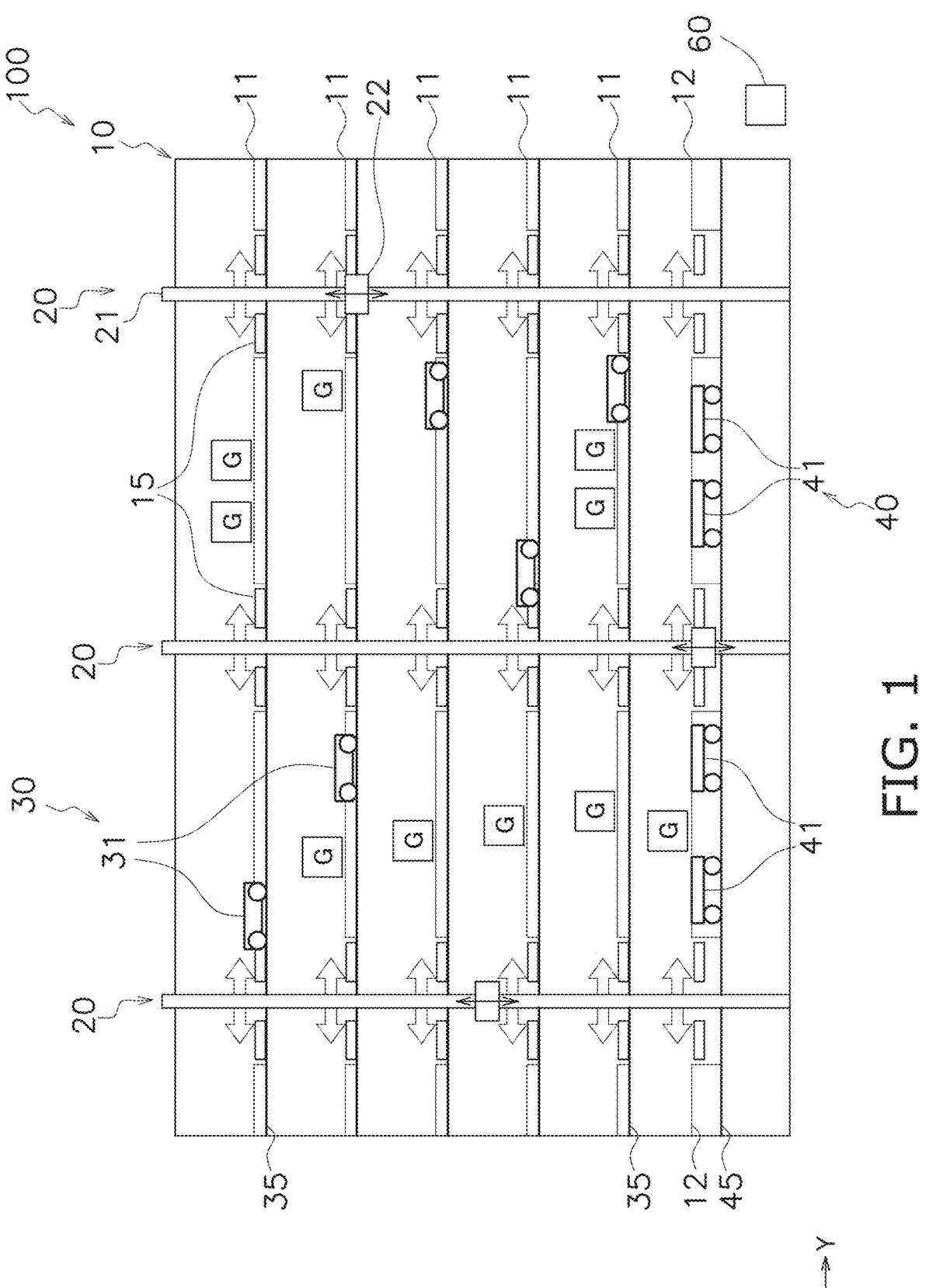
FIG. 1 is a schematic front view of a picking system 100 according to a first preferred embodiment of the present invention.
Figure 2:
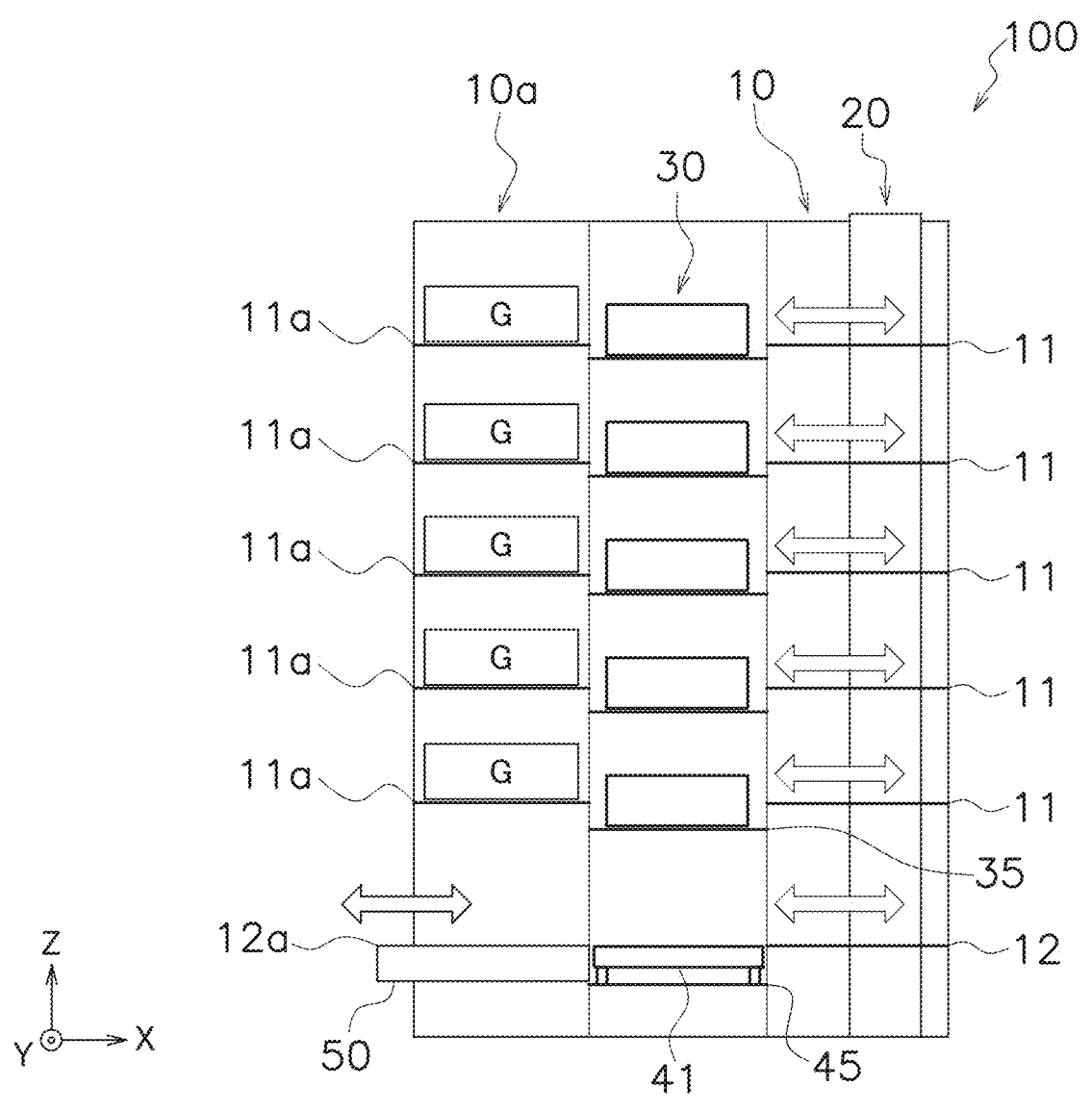
FIG. 2 is a schematic side view of the picking system 100 of the first preferred embodiment of the present invention.
Figure 4:
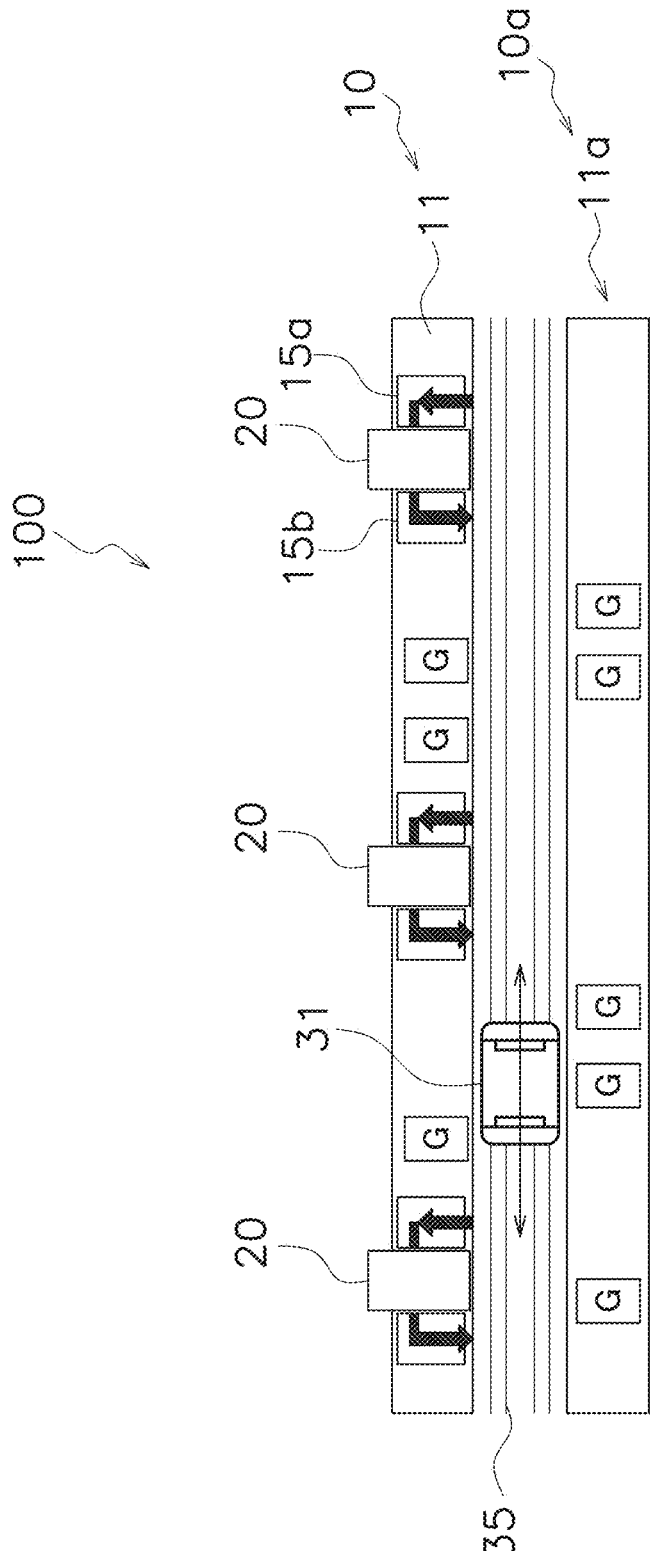
FIG. 4 is a schematic plan view of an upper shelf tier 11 of the rack of the picking system 100 of the first preferred embodiment of the present invention.
Figure 4:
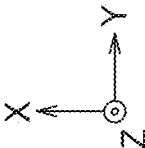

With reference to FIGS. 1 to 4, a picking system according to a first preferred embodiment of the present invention is described. FIG. 1 is a schematic front view of a picking system 100 of the first preferred embodiment. In FIG. 1, the height direction is referred to as Z direction, and in the horizontal direction, a longitudinal direction of a rack 10 is referred to as Y direction while the direction perpendicular thereto is referred to as X direction. FIG. 2 is a schematic side view of the picking system 100 viewed from the Y direction, and FIGS. 3 and 4 are schematic plan views of a lower shelf tier 12 and an upper shelf tier 11, respectively, of the rack 10 of the picking system 100.

The picking system 100 includes the rack 10, a vertical conveying device 20, a plurality of shuttle carriage devices 30, a linear motor carriage device 40, and a picking station 50.

The rack 10 includes a plurality of the upper shelf tiers 11 and one or more lower shelf tiers 12. The shelf tier is a tier where a shelf is placed. The shelf is a structure where goods are placed. In this preferred embodiment, a lower tier is the lower shelf tier 12, because a portion thereof can store goods. The upper shelf tier 11 stores goods G, and is used to keep the goods G. The lower shelf tier 12 usually includes one or two tiers. The lower shelf tier 12 may include three or four tiers if they are within a range workers can reach with their hands. The picking station may be provided on a portion or an entirety of the lower tier. The lower tier on which the picking station is provided may be referred to as a picking tier. The lower tier may be a place (shelf tier) where goods are temporarily placed for screening or sorting by the picking station. A portion of the lower tier may be used for keeping the goods G. In other words, it can be used in the same manner as the upper shelf tier 11. The lower shelf tier 12 may be not a shelf tier for goods but a tier on which only the picking station is provided.

The goods G may include articles and a container that houses the articles. The container is a case, a tray, a cardboard box, a folding container, a pallet, or the like.

In addition, each of the shelf tiers 11 and 12 includes a transfer device 15 located adjacent to the vertical conveying device 20 to transfer the goods G from and to the vertical conveying device 20. The transfer device 15 is a conveyor, for example. The transfer device 15 includes a transfer device 15a for loading to a platform 22 of the vertical conveying device 20 and a transfer device 15b for unloading from the platform 22. The transfer device 15 may be a transfer device that can transfer goods to and from the platform 22 bidirectionally.

In this preferred embodiment, as the transfer device 15 for loading or unloading from the platform 22, different types are used for the upper tier side and for the lower tier side. As the transfer device 15 for the upper tier side, a roller conveyor is used, which can carry goods in one direction (here, in the Y direction). The roller conveyor carries the goods G in the Y direction between the platform 22 and the transfer device 15. In addition, the transfer device 15 on the upper tier side receives and delivers the goods G from and to a shuttle carriage 31 in the X direction. The shuttle carriage 31 includes a rear hook type transfer device 32. The rear hook type transfer device 32 carries the goods G between the carriage 31 and the transfer device 15 in the X direction. As the transfer device 15 for the lower tier side, a direction changing conveyor is used. The direction changing conveyor can change its conveying direction between the X direction and the Y direction. The direction changing conveyor changes its conveying direction by moving X direction rollers or Y direction rollers upward or downward. The direction changing conveyor delivers the goods G to and from the platform 22 in the Y direction, and delivers the goods G to and from a linear motor carriage 41 in the X direction.

The shelf tiers 11 and 12 are arranged to substantially overlap in a top view. Each shelf tier extends in the Y direction. The carriage device 30, 40 to carry the goods G is arranged along each shelf tier.

The picking system 100 of this preferred embodiment further includes a rack 10a in addition to the rack 10. The rack 10a includes a plurality of upper shelf tiers 11a and a lower shelf tier 12a. The picking station 50 is incorporated on the lower shelf tier 12a.

The vertical conveying device 20 is incorporated in the rack 10 as illustrated in FIGS. 1 to 4. In this preferred embodiment, three vertical conveying devices 20 are arranged in the longitudinal direction (Y direction) of the rack 10 and are inserted in the shelf tiers 11 and 12. The vertical conveying device 20 vertically conveys the goods G from the upper tier to the lower tier, or from the lower tier to the upper tier. The vertical conveying device 20 includes a column 21 and the platform 22. The goods G can be placed on the platform 22. The platform 22 with or without the goods G moves along the column in the vertical direction (Z direction). The platform 22 includes a conveyor for loading or unloading the goods G from the platform 22. This conveyor is a roller conveyor that can move the goods in one direction (Y direction).

The shuttle carriage device 30 includes the shuttle carriage 31 and a rail 35.

The rail 35 extends along the upper shelf tier 11 in the Y direction. In principle, the rail 35 includes a pair of rails for each shelf tier 11.

Figure 5:
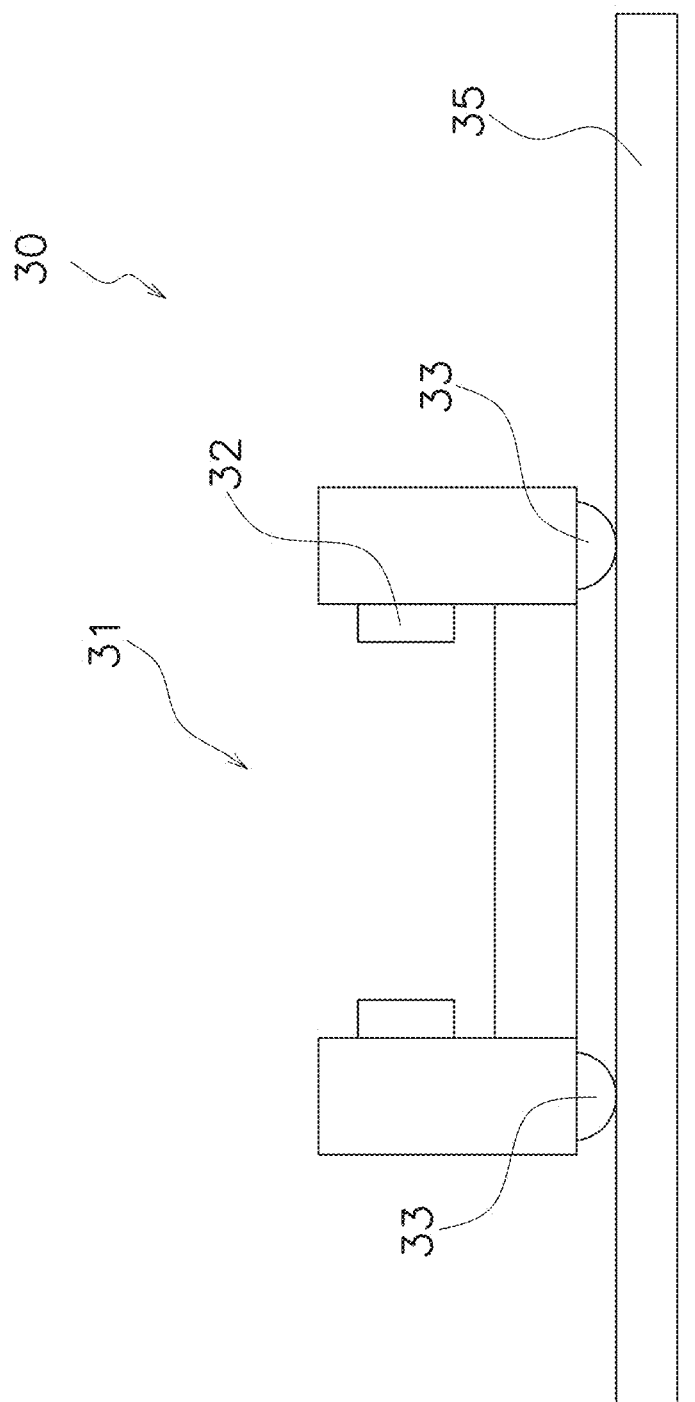
FIG. 5 is a schematic side view of a shuttle carriage device 30.
Figure 5:
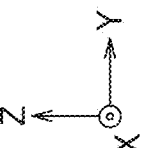

The shuttle carriage 31 is provided on the rail 35. One or more shuttle carriages 31 are provided adjacent to each of the upper shelf tiers 11. The shuttle carriage 31 is driven by a rotation motor. The shuttle carriage 31 carries the goods G in the horizontal direction (Y direction) at each shelf tier 11. The shuttle carriage 31 can travel bidirectionally in the Y direction. As illustrated in FIG. 5, the shuttle carriage 31 includes wheels 33 and the transfer device 32. The wheels 33 are placed on the rail 35. The drive force of the rotation motor is transmitted to the wheels 33, and the shuttle carriage 31 moves in the Y direction when the wheels 33 rotate. The transfer device 32 may be a rear hook type or may be a conveyor type. In this preferred embodiment, the transfer device 32 is a rear hook type. The transfer device 32 transfers the goods G between the shuttle carriage 31 and the shelf tier 11 or the transfer device 15. The transfer device 32 carries the goods G in the X direction from the carriage 31 to the upper shelf tier 11, or oppositely from the shelf tier 11 to the carriage 31. In addition, the transfer device 32 carries the goods G in the X direction from the carriage 31 to the transfer device 15, or oppositely from the transfer device 15 to the carriage 31.

The linear motor carriage device 40 extends linearly along the lower shelf tier 12 in the Y direction. The linear motor carriage device 40 can deliver the goods G to and from the transfer device 15 for loading or unloading from the platform 22 on the lower tier side. The linear motor carriage device 40 may be capable of delivering goods directly to and from the platform 22. Details of the linear motor carriage device 40 will be described later.

The picking station 50 extends along the linear motor carriage device 40 on the lower tier side. A plurality of the picking stations 50 are spaced apart in the carrying direction of the linear motor carriage device 40. The picking station 50 is located corresponding to the lower shelf tier 12. Therefore, if the lower shelf tier 12 includes two tiers, the picking station 50 is provided for each tier. In this preferred embodiment, the picking station 50 is provided on the lower tier side of the rack 10a. The picking station 50 may be provided on the lower tier side of the rack 10. It may be provided on each of them.

In the picking station 50, a human or a robot performs screening or sorting of the goods G. In the picking station 50, the linear motor carriage 41 cooperates with the conveyor so as to load or unload the goods G.

The picking station 50 may be a reciprocating conveyor for both loading and unloading. A plurality of the reciprocating conveyors may be provided. In the picking station 50 illustrated in FIG. 3, four reciprocating conveyors are arranged in a row, for example. One or more picking stations 50 are provided for one shelf tier on the lower tier side. In this preferred embodiment, two picking stations 50 are provided.

The picking station 50 may be a conveyor that conveys the goods G unidirectionally for unloading from the carriage or loading to the carriage. The picking station 50 may include a conveyor for unloading, a conveyor for loading, and a conveyor for conveying the goods G between the both conveyors, which are arranged in U-shape. The picking station 50 may be a placing table (without a conveyor or the like), on which a worker can perform picking from rear side (the side opposite to the carriage).

A controller 60 controls the transfer device 15, the vertical conveying device 20, the shuttle carriage 31, and the linear motor carriage device 40 of the rack 10. The controller 60 may include a computer. The computer includes a processor, a storage device, and various interfaces. The processor is a CPU, for example. The storage device is a ROM, a RAM, an HDD, an SSD, and the like, for example. The various interfaces are an A/D converter, a D/A converter, a communication interface, and the like, for example.

The linear motor carriage device 40 includes the linear motor carriage 41 and a rail 45.

The linear motor carriage device 40 includes a traveling drive mechanism and a transfer mechanism. The traveling drive mechanism drives the linear motor carriage 41 to travel on the rail 45. The transfer mechanism performs loading and unloading of the goods G to and from the linear motor carriage 41 at a station where the linear motor carriage 41 stops.

The linear motor carriage device 40 is adjacent to the lower shelf tier 12. If the lower shelf tier includes two tiers, two linear motor carriage devices 40 are provided along the lower shelf tiers 12, respectively. Two or more linear motor carriages 41 are provided for each tier 12. Preferably, two or more of them are provided. Four linear motor carriages 41 are provided in FIG. 1, for example. The linear motor carriage 41 carries the goods G in the horizontal direction (Y direction) along the shelf tier 12. The linear motor carriage 41 can travel bidirectionally in the Y direction.

In the first preferred embodiment, the rail 45 of the linear motor carriage device 40 is linear. The carriage 41 travels bidirectionally in a straight line. The plurality of carriages 41 are controlled individually so as to avoid collision with each other, and travel in overlapping areas.

Figure 6:
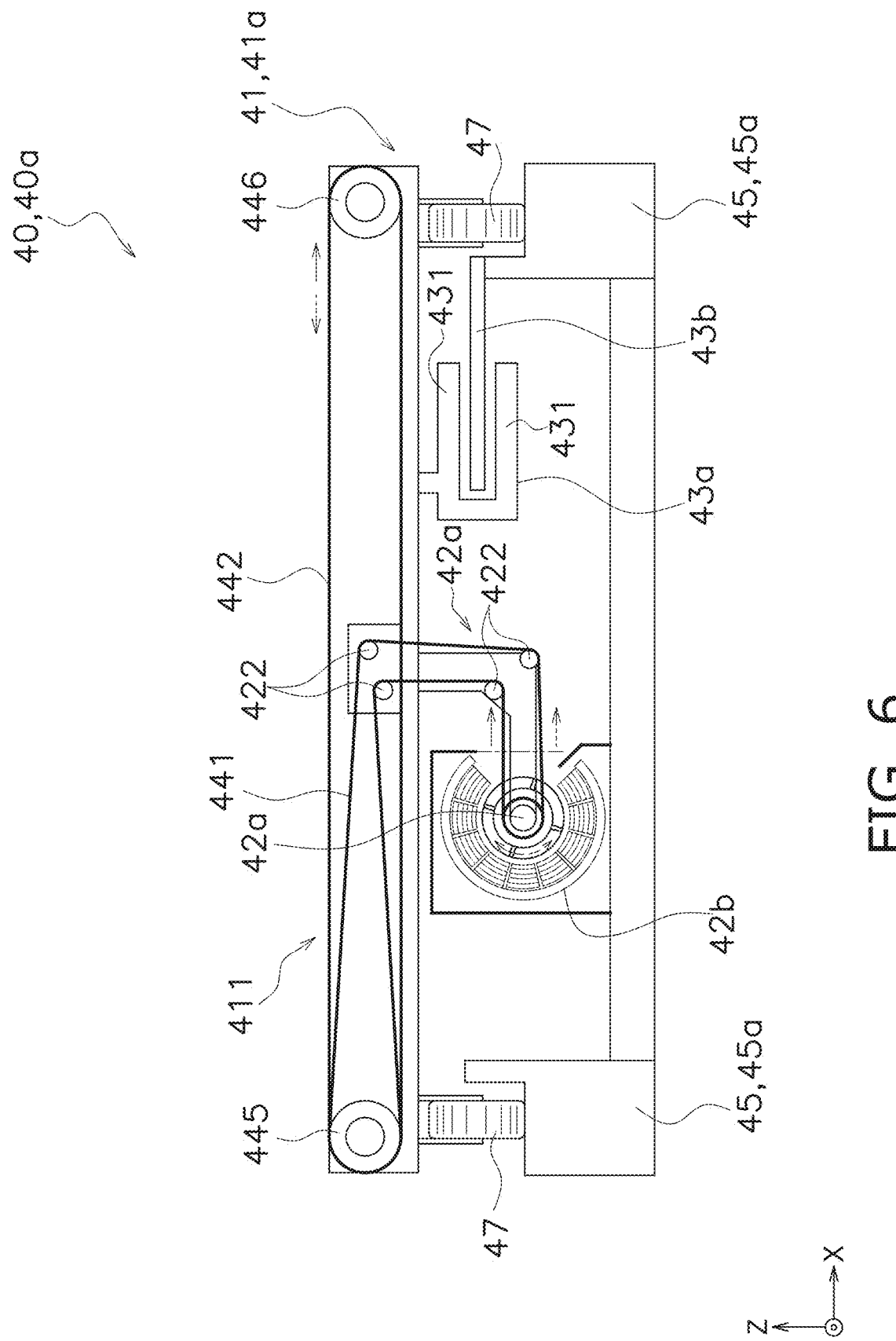

As illustrated in FIG. 6, the linear motor carriage 41 includes a main body 411, a first movable element 42a, a second movable element 43a, a first endless belt 441, a second endless belt 442, a first pulley 445, a second pulley 446, and a plurality of wheels 47. The linear motor carriage device 40 includes the rail 45, a first stator 42b, and a second stator 43b, on the rail 45 side.

The traveling drive mechanism of the linear motor carriage device 40 includes the second movable element 43a of the carriage 41 and the second stator 43b on the rail 45 side.

The second movable element 43a includes a plurality of permanent magnets 431. The second movable element 43a is attached to an underside of the carriage main body 411. As illustrated in FIG. 6, the second movable element 43a has two rows arranged in the height direction (Z direction) with an opening in the X direction between them, and the second stator 43b fixed to the rail 45 is inserted into the opening. The plurality of permanent magnets 431 each include north poles and south poles arranged alternately along the traveling direction of the carriage (Y direction), on the side opposed to the second stator 43b. In FIG. 6, two permanent magnets 431 of the second movable element 43a are provided above and below the second stator 43b, but it may be possible that only one of them is provided above or below the second stator 43b.

The second stator 43b extends along the rail 45. The second stator 43b includes a plurality of substrates arranged along the rail, and a plurality of coils arranged along the extending direction of each substrate. Currents flowing in the plurality of coils are controlled individually to cause interaction with the permanent magnets of the second movable element 43a of the carriage 41, so that a force is generated in the Y direction. In this way, the carriage 41 can obtain a drive force for traveling in the Y direction.

As the linear motor carriage 41 is driven by a linear motor, it can travel at higher speed than the shuttle carriage 31, and can have larger acceleration and deceleration. Therefore, the linear motor carriage 41 can have shorter carrying time of goods than the shuttle carriage 31.

Next, the transfer mechanism of the linear motor carriage device 40 is described.

The transfer mechanism of the linear motor carriage device 40 of this preferred embodiment is a belt conveyor using the first and second endless belts 441 and 442. It may be a roller conveyor.

The transfer mechanism includes the first stator 42b on the rail side, the first movable element 42a of the linear motor carriage 41, the first endless belt 441, the second endless belt 442, the first pulley 445, and the second pulley 446.

The first movable element 42a has a cylindrical shape. The axis of the cylinder extends along the Y direction. A plurality of permanent magnets are arranged on a peripheral surface of the cylinder. North poles and south poles of the permanent magnets are arranged alternately in the circumferential direction. The first endless belt 441 is wound around the first movable element 42a.

A plurality of the first stators 42b are arranged discretely in the Y direction along the rail 45. In other words, the first stators 42b are arranged along the rail 45, at station positions or the like, where the goods G are loaded to or unloaded from the linear motor carriage 41.

When the carriage 41 is at the station position or the like for loading or unloading, as illustrated in FIG. 6, the first stator 42b has a cylindrical shape covering the periphery of the first movable element 42a having a cylindrical rod shape. An opening is provided in a portion of this cylinder. The first stator 42b includes a plurality of coils arranged in the circumferential direction of the cylinder. Currents flowing in the coils cause magnetic fields, and variations in the currents cause variations in the magnetic fields, which cause interaction with the permanent magnets of the first movable element 42a, so that a drive force for rotating the first movable element 42a is generated.

The first endless belt 441 is wound around the first movable element 42a on one side, and is also wound around the first pulley 445 via a plurality of support rollers 422. In addition, the second endless belt 442 is wound around the first pulley 445 on one side and is wound around the second pulley 446 on the other side. The goods G are placed on the second endless belt 442.

When the current in the coils of the first stator 42*b* vary, interaction with the permanent magnets of the first movable element 42*a* is generated, and the first movable element 42*a* rotates. When the first movable element 42*a* rotates, the first endless belt 441 wound around it rotates. The rotation of the first endless belt 441 is transmitted to the first pulley 445. The rotation of the first pulley 445 is transmitted to the second endless belt 442. When the second endless belt 442 moves, the goods G on the second endless belt 442 are conveyed.

The transfer mechanism may be another mechanism different from that described above. For instance, it may be a mechanism of a rear hook type or the like.

In addition, the transfer mechanism is controlled by currents in the coils of the first stator 42*b* on the rail 45 side as described above. The transfer mechanism may be driven by a battery mounted in the carriage 41.

A procedure of transferring the goods G stored on the upper shelf tier 11 of the rack 10 to the picking station 50 is described.

First, the shuttle carriage 31 is moved to front of the goods G stored on the upper shelf tier 11. The transfer device 32 of the shuttle carriage 31 moves the goods G on the shelf tier 11 to the shuttle carriage 31. The carriage 31 carrying the goods G moves on the rail 35 and stops in front of the transfer device 15 adjacent to the vertical conveying device 20. The transfer device 32 of the shuttle carriage 31 moves the goods G on the carriage 31 to the transfer device 15. The vertical conveying device 20 moves the platform 22 to the predetermined upper shelf tier 11. The transfer device 15 carrying the goods G and the conveyor on the platform 22 are controlled to cooperate, so as to transfer the goods G from the transfer device 15 to the platform 22. The platform 22 carrying the goods G moves down along the column 21 and stops at the height of the lower shelf tier 12. The conveyor of the platform 22 and the transfer device 15 at the height of the lower shelf tier 12 are controlled to cooperate, so as to move the goods G on the platform 22 to the transfer device 15.

Next, along the shelf tier 12 on the lower tier side, the linear motor carriage 41 is moved to the station in front of the transfer device 15 on the rail 45. The transfer device 15 carrying the goods G and the transfer mechanism on the linear motor carriage 41 are controlled to cooperate, so as to move the goods G from the transfer device 15 to the linear motor carriage 41. The linear motor carriage 41 carrying the goods G is moved on the rail 45 and is stopped in front of the picking station 50. The transfer mechanism of the linear motor carriage 41 and the conveyor of the picking station 50 are controlled to cooperate, so as to transfer the goods G on the linear motor carriage 41 to the picking station 50.

By the process described above, the goods G stored on the upper shelf tier 11 of the rack 10 can be transferred to the picking station 50.

The goods G remaining after picking at the picking station 50 are moved from the picking station 50 along a path nearly opposite to the above description, and are stored on the upper shelf tier 11.

As understood from the above description, the picking system 100 of this preferred embodiment has a greater number of upper shelf tiers 11 than the lower shelf tiers 12 including one or two tiers. Therefore, it is clear that carrying amount of goods of the linear motor carriage 41 on the lower tier side is greater than that of the shuttle carriage on the upper tier side. Therefore, if the same shuttle carriage on the upper tier side is used for the carriage on the lower tier side similarly to the conventional system, carrying the goods G on the lower tier side will become a bottleneck, and carrying the goods G will be stuck. Even if the number of the carriages on the lower tier side is increased, during stopping of one carriage, other carriages are hindered from moving, and the carrying speed cannot be improved dramatically. In order to improve this situation, in the picking system 100 of the present disclosure, the high speed linear motor carriage 41 is used on the lower shelf side. As the linear motor carriage 41 is used on the lower shelf side, the carrying speed of the goods G on the lower shelf side is improved, and the carrying speed and the carrying amount of the goods G in the whole picking station are improved.

Figure 7:
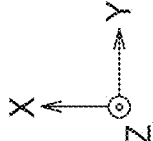
FIG. 7 is a schematic plan view of a lower tier side of the rack of a picking system 100a of a modified preferred embodiment 1A of the present invention.

As illustrated in FIG. 7, a picking system 100*a* of a modified preferred embodiment 1A further includes a rack 10*b*, and a plurality of shuttle carriage devices 30*a*, in addition to the picking system 100 of the first preferred embodiment. The plurality of shuttle carriage devices 30*a* are arranged along an upper shelf tier 11*b* (not shown) and a lower shelf tier 12*b* of the rack 10*b*. Each of the plurality of shuttle carriage devices 30*a* includes a shuttle carriage 31*a* and a rail 35*a*.

In the modified preferred embodiment 1A, the vertical conveying device 20 is shared between the rack 10 and the rack 10*b*. Each shelf tier 11*b*, 12*b* of the rack 10*b* includes a delivering device 16. The delivering device 16 transfers the goods G between the racks 10 and 10*b* in the X direction. The delivering device 16 is adjacent to the transfer device 15. The delivering device 16 on the lower tier side connects the lower shelf tier 12*b* of the rack 10*b* and the lower shelf tier 12 of the rack 10 at substantially the same height. In addition, the delivering device 16 on the upper tier side connects the upper shelf tier 11*b* of the rack 10*b* and the upper shelf tier 11 of the rack 10 at substantially the same height. The delivering device 16 may be a conveyor. The conveyor may be a roller conveyor that delivers goods in one direction (X direction). The vertical conveying device 20 moves vertically so that the goods G reaches the height of the upper shelf tier 11*b* or the lower shelf tier 12*b* of the rack 10*b*. The goods G are conveyed from the platform 22 to the transfer device 15. The goods G are further conveyed from the transfer device 15 to the delivering device 16. The goods G are conveyed from the delivering device 16 to a placing position on each shelf tier 11*b*, 12*b* by the shuttle carriage 31*a*.

As the picking system 100*a* of the modified preferred embodiment 1A includes the rack 10*b* in addition to the picking system 100 of the first preferred embodiment, more goods G can be stored. In addition, as the vertical conveying device is shared between the rack 10 and the rack 10*b* in the picking system 100*a* of the modified preferred embodiment 1A, the facility can be simplified compared with storing amount of the goods G, and the installation cost of the picking system can be reduced.

Figure 8:
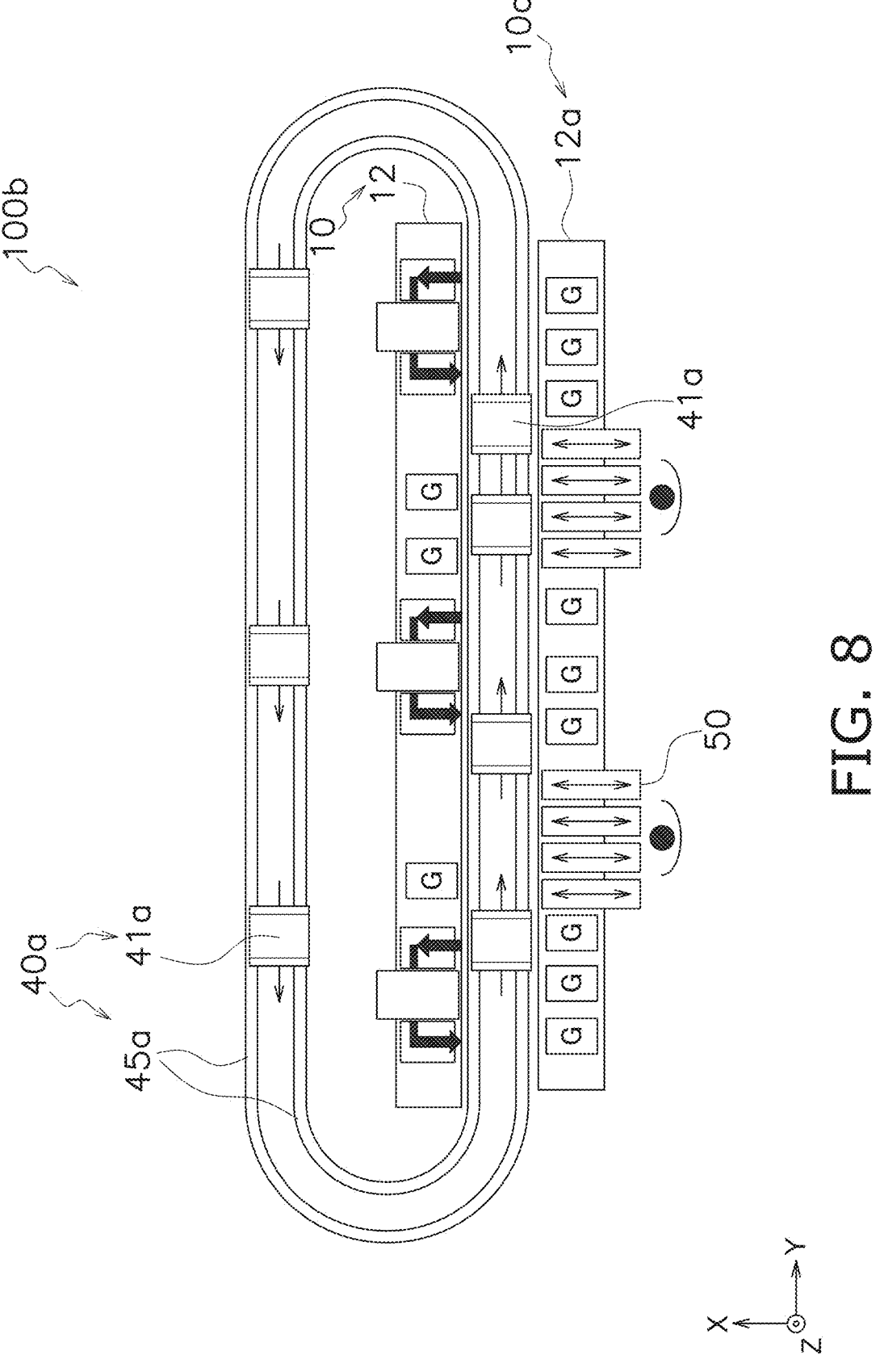
FIG. 8 is a schematic plan view of the lower tier side of the rack of a picking system 100b of a second preferred embodiment of the present invention.

A structure of a picking system 100*b* of a second preferred embodiment is the same as that of the picking system 100 of the first preferred embodiment except for a linear motor carriage device 40*a*. FIG. 8 is a schematic plan view of the lower tier side of the rack of the picking system 100*b* of the second preferred embodiment.

The linear motor carriage device 40*a* includes a linear motor carriage 41*a* and a rail 45*a*. The rail 45*a* is a loop track and defines a circuit path. The linear motor carriage 41*a* travels unidirectionally on the loop track. In the example of FIG. 8, eight linear motor carriages 41*a* are provided on one loop track. Other structures of the linear motor carriage device 40*a* are the same as those of the linear motor carriage device 40 in the first preferred embodiment.

As the picking system 100*b* of the second preferred embodiment 2A has the loop track, a lot of carriages can be provided, and a large amount of goods G can be conveyed at high speed.

Figure 12:
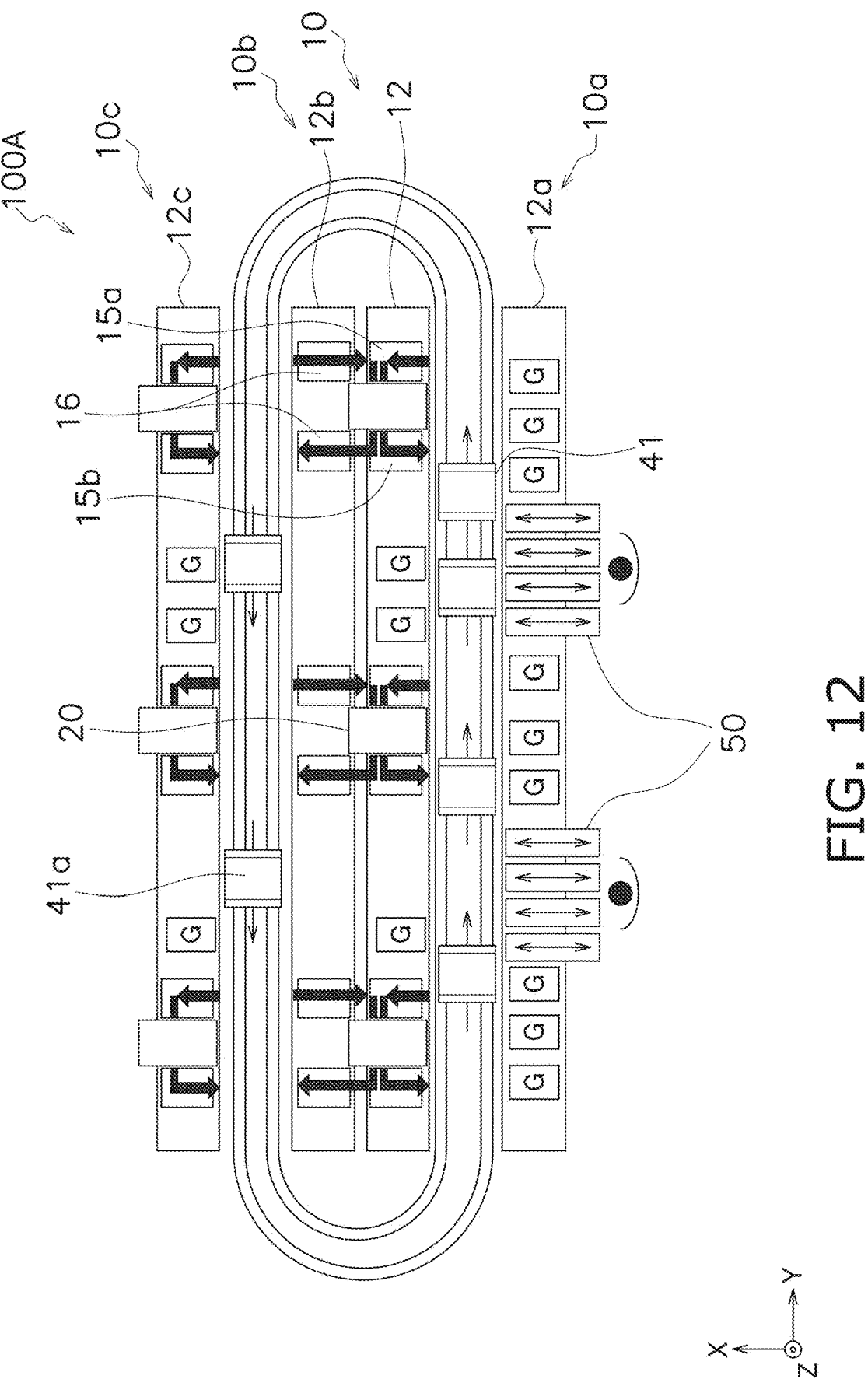
FIG. 12 is a schematic plan view of the lower tier side of the rack of a picking system 100A of a modified preferred embodiment 2a of the present invention.

As illustrated in FIG. 12, a picking system 100A of a modified preferred embodiment 2a further includes the rack 10*b*, and the plurality of shuttle carriage devices 30*a* (not shown), in addition to the picking system 100*b* of the second preferred embodiment (FIG. 8). The plurality of shuttle carriage devices 30*a* are arranged along the upper shelf tier 11*b* (not shown) of the rack 10*b*. Each of the plurality of shuttle carriage devices 30*a* includes the shuttle carriage 31*a* and the rail 35*a*.

In the modified preferred embodiment 2a, the vertical conveying device 20 is shared between the rack 10 and the rack 10*b*. Each shelf tier 11*b*, 12*b* of the rack 10*b* includes the delivering device 16. The delivering device 16 transfers the goods G between the racks 10 and 10*b* in the X direction. The delivering device 16 is adjacent to the transfer device 15. The delivering device 16 on the lower tier side connects the lower shelf tier 12*b* of the rack 10*b* and the lower shelf tier 12 of the rack 10 at substantially the same height. In addition, the delivering device 16 of the upper tier side connects the upper shelf tier 11*b* of the rack 10*b* and the upper shelf tier 11 of the rack 10 at substantially the same height. The delivering device 16 may be a conveyor. The conveyor may be a roller conveyor that delivers goods in one direction (X direction). The vertical conveying device 20 moves vertically so that the goods G reaches the height of the upper shelf tier 11*b* or the lower shelf tier 12*b* of the rack 10*b*. The goods G are conveyed from the platform 22 to the transfer device 15. On the lower tier side, the goods are transferred between the transfer device 15 and the linear motor carriage 41*a*. On the lower tier side, the linear motor carriage 41*a* carries the goods G to a placing position on the shelf tier 12*b*. On the upper tier side, the goods G conveyed from the platform 22 to the transfer device 15 are conveyed from the transfer device 15 to the delivering device 16 of the rack 10*b*. On the upper tier side, the goods are transferred between the delivering device 16 of the rack 10*b* and the shuttle carriage 31*a*. On the upper tier side, the shuttle carriage 31*a* conveys the goods G to a placing position on the shelf tier 11*b*.

As the picking system 100A of the modified preferred embodiment 2a includes the rack 10*b* in addition to the picking system 100 of the second preferred embodiment, more goods G can be stored. In addition, as the vertical conveying device is shared between the rack 10 and the rack 10*b* in the picking system 100A of the modified preferred embodiment 2a, the facility can be simplified compared with storing amount of the goods G, and the installation cost of the picking system can be reduced.

In addition, as illustrated in FIG. 12, the picking system 100A may further include a rack 10*c* on the outside of the loop track. Similarly to the rack 10, the rack 10*c* includes a plurality of upper shelf tiers 11*c* (not shown) and one or two lower shelf tiers 12*c*. The linear motor carriage 40*a*, which travels around, travels along the lower shelf tier 12*c*, so as to transfer goods between the lower shelf tier 12*c* and the linear motor carriage 40*a*. Along each of the upper shelf tiers 11*c*, the shuttle carriage 31*a*, which is shared with the other shelf tier 11*b*, travels so as to transfer goods between the upper shelf tier 11*c* and the shuttle carriage 31*a*. As the picking system 100A further includes the rack 10*c*, storing amount of the goods G can be increased with relatively small space.

Figure 9:
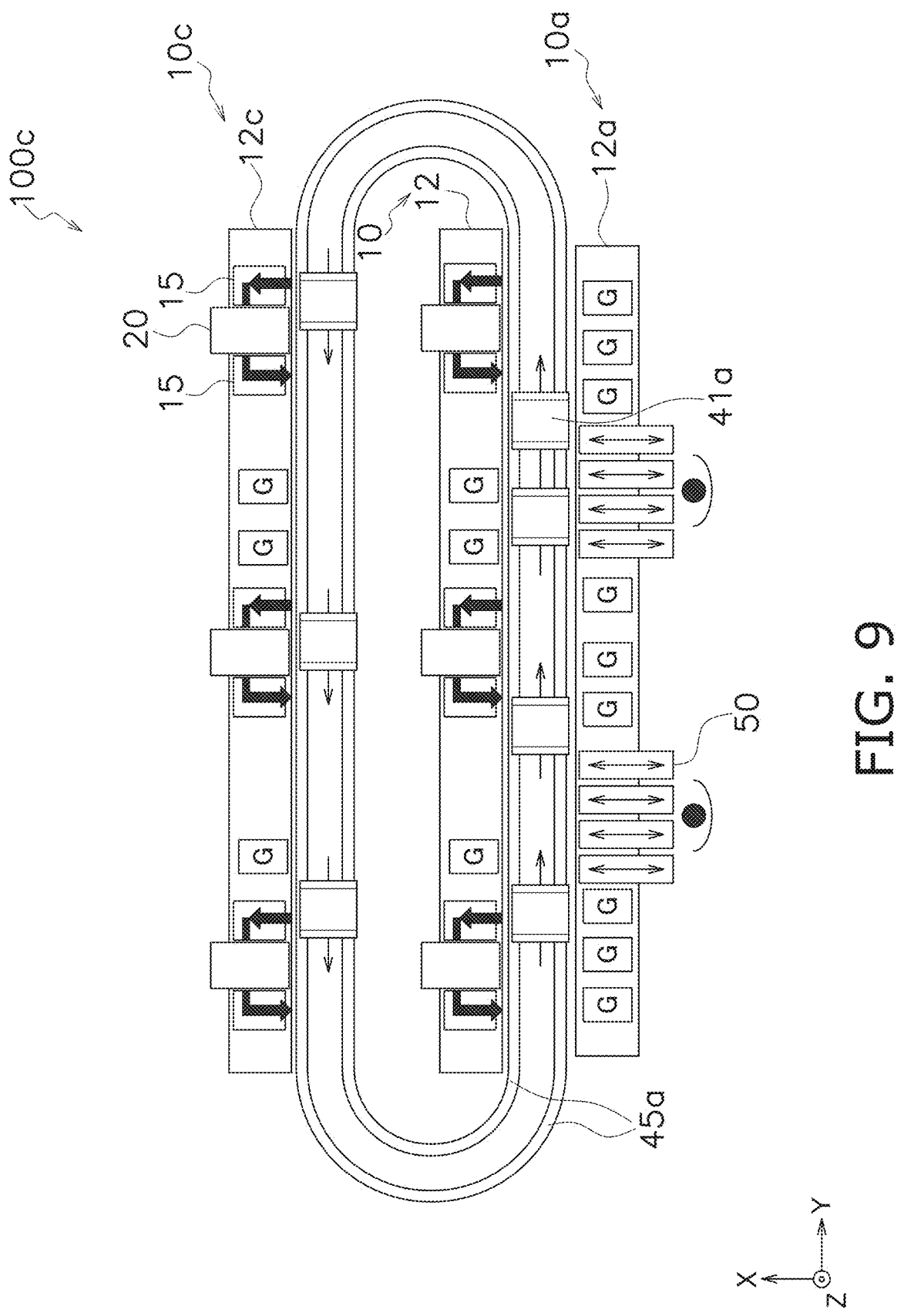
FIG. 9 is a schematic plan view of the lower tier side of the rack of a picking system 100c of a modified preferred embodiment 2A of the present invention.

FIG. 9 is a schematic plan view of the lower tier side of the rack in a picking system 100*c* of a modified preferred embodiment 2A. A structure of the picking system 100*c* of the modified preferred embodiment 2A includes the rack 10*c*, the vertical conveying device 20, and the shuttle carriage device 30 (not shown), in addition to the structure of the picking system 100*b* of the second preferred embodiment. Similarly to the rack 10, the rack 10*c* includes the plurality of upper shelf tiers 11*c* (not shown) and one or two lower shelf tiers. The linear motor carriage device 40*a* extends along the lower shelf tier 12*c*. In other words, the lower tier of the rack 10*c* is adjacent to the loop track. More specifically, it is adjacent to the racks 10, 10*a*, and 10*c* entirely over their longitudinal direction, and curved rails are provided at sections off the racks 10, 10*a*, and 10*c* so as to define the loop track. By securing a long neighboring distance between the loop track and the rack 10, 10*a*, 10*c*, it is possible to secure a lot of positions for transferring the goods G between the linear motor carriage 41 and the picking station 50 or the like of the rack 10, 10*a*, 10*c*. If the rack 10 has two lower shelf tiers 12, the rack 10*c* also has two lower shelf tiers 12*c*, and two linear motor carriage devices 40*a* are arranged along the two shelf tiers, respectively. In other words, the loop track (rail 45*a*) also has a two-deck structure, in this case. The shuttle carriage device 30 (not shown) is provided above the linear motor carriage device 40*a*, along the upper shelf tier 11*c* (not shown). The shuttle carriage device 30 is arranged linearly in the same manner as the shuttle carriage device 30 that extends along the rack 10.

The picking system 100*c* of the modified preferred embodiment 2A includes the rack 10*c* in addition to the picking system 100 of the first preferred embodiment or the picking system 100*b* of the second preferred embodiment, and hence it has a greater storing amount of the goods G. The picking system 100*c* has a greater carrying amount of the goods G on the lower tier side, and by using the high speed linear motor carriage 41*a*, a large carrying amount can be processed quickly.

Figure 10:
FIG. 10 is a schematic plan view of the lower tier side of the rack of a picking system 100d of a modified preferred embodiment 2B of the present invention.

As illustrated in FIG. 10, a picking system 100*d* of a modified preferred embodiment 2B is different from the picking system 100*c* of the modified preferred embodiment 2A in the position of the rack 10*c*, and further includes a rack 10*d* having the picking station 50 on a lower shelf tier 12*d*. The rack 10*d* includes a plurality of upper shelf tiers 11*d* (not shown) and one or two lower shelf tiers 12*d*.

As the picking system 100*d* of the modified preferred embodiment 2B includes the picking station 50 in addition to the picking system 100*c* of the modified preferred embodiment 2A, it has high picking ability. Further, as the rack 10*d* is added, it has a greater storing amount of the goods G. Therefore, the picking system 100*d* has a greater carrying amount of the goods G on the lower tier side, and by using the high speed linear motor carriage 41*a*, a large carrying amount can be processed quickly.

In addition, in the picking system 100*a* of the modified preferred embodiment 1A, the rack 10 and the rack 10*b* are adjacent to each other, and the rack 10 and the rack 10*b* share the vertical conveying device 20, as described above. In the same manner in the picking system 100*d* of the modified preferred embodiment 2B, the rack 10 and the rack 10*c* may be adjacent to each other, so as to share the vertical conveying device 20.

Figure 11:
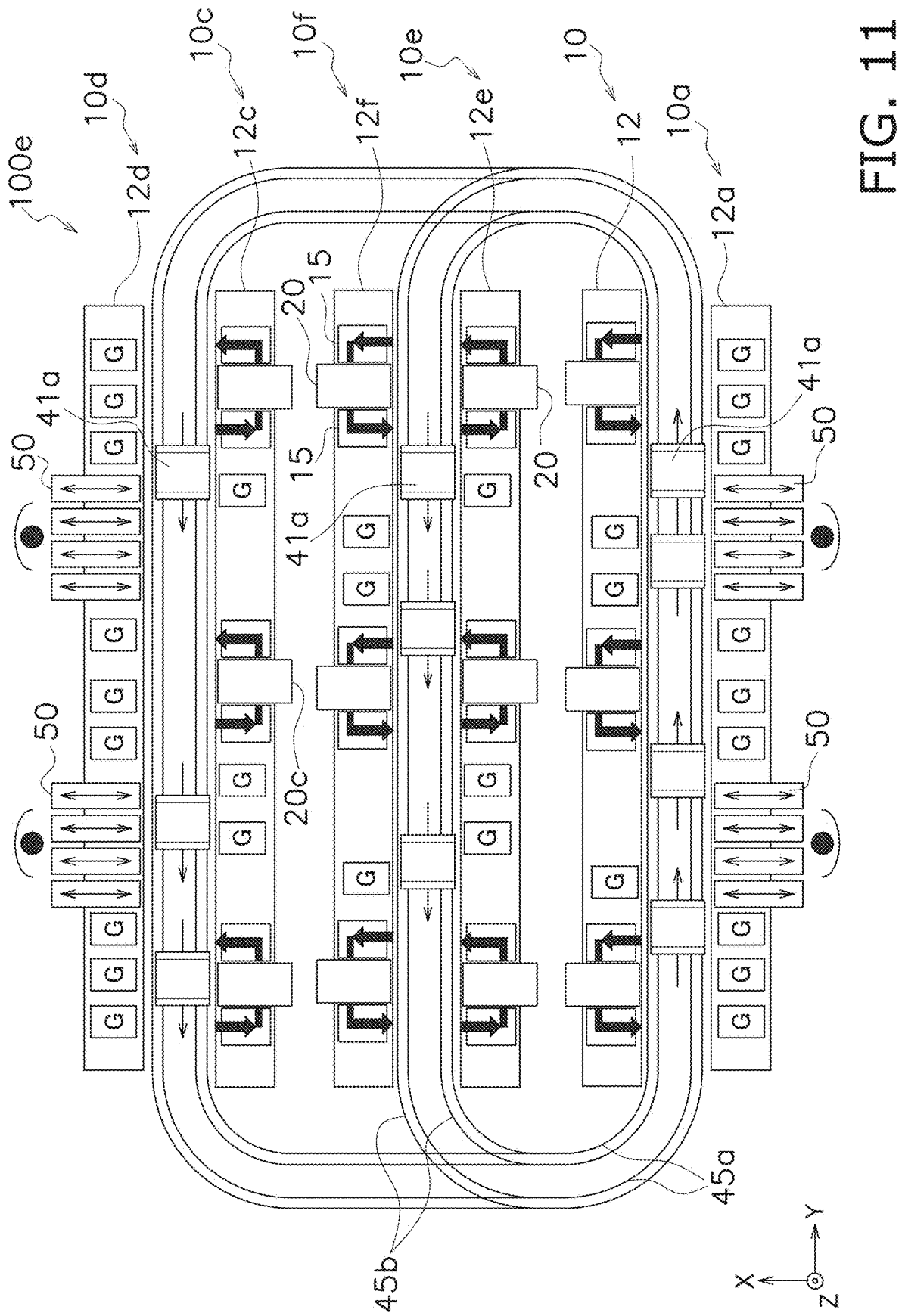
FIG. 11 is a schematic plan view of the lower tier side of the rack of a picking system 100e of a modified preferred embodiment 2C of the present invention.

As illustrated in FIG. 11, a picking system 100*e* of a modified preferred embodiment 2C includes a branch rail 45*b* positioned to divide the inside of the rail 45*a* forming the loop track on the lower tier side. Further, along the branch rail 45*b*, a lower shelf tier 12*e* of a rack 10*e* and a lower shelf tier 12*f* of a rack 10*f* are provided. The rack 10*e* and the rack 10*f* also include their upper shelf tiers, respectively. It may be possible that only one of the rack 10*e* and the rack 10*f* is provided.

The picking system 100*e* of the modified preferred embodiment 2C includes the racks 10*e* and 10*f* in addition to the picking system 100*d* of the modified preferred embodiment 2B, and has a greater storing amount of the goods G. Therefore, the picking system 100*e* has a greater carrying amount of the goods G on the lower tier side, and by using the high speed linear motor carriage 41*a*, a large carrying amount can be processed quickly.

In addition, in the picking system 100*d* of the modified preferred embodiment 2B, the rack 10 and the rack 10*c* are adjacent to each other, so that the rack 10 and the rack 10*c* can share the vertical conveying device 20, as described above. In the same manner in the picking system 100*e* of the modified preferred embodiment 2C, the rack 10 and the rack 10*e*, or the rack 10*c* and the rack 10*f* may be adjacent to each other, so as to share the vertical conveying device 20.

The first and second preferred embodiments and the modified preferred embodiments have the common structure and function as follows.

The picking system 100, 100*a*, 100A, 100*b*, 100*c*, 100*d*, 100*e* includes the rack 10, the vertical conveying device 20, the shuttle carriage device 30, the linear motor carriage device 40, 40*a*, and the picking station 50. The rack 10 includes a plurality of shelf tiers for storing goods G. The vertical conveying device 20 can deliver the goods G to or from each shelf tier of the rack, and vertically conveys the goods G. The shuttle carriage device 30 includes the shuttle carriage 31 and the rail 35. The shuttle carriage is adjacent to the upper shelf tier 11 among the plurality of shelf tiers of the rack, so as to store or retrieve the goods G on each shelf tier, and conveys the same on each shelf tier. The picking station 50 extends along the lower shelf tier 12 among the plurality of shelf tiers of the rack. The linear motor carriage device 40, 40*a* includes the linear motor carriage 41, 41*a* and the rail 45. The linear motor carriage 41, 41*a* is adjacent to the lower shelf among the plurality of shelf tiers of the rack, so as to carry the goods G into or out of the picking station.

In the above description, the lower tier side of the rack has the lower shelf tier, but it may have a lower tier without a shelf.

The picking systems 100, 100*a*, 100A, 100*b*, 100*c*, 100*d*, 100*e* according to preferred embodiments of the present invention include the high speed linear motor carriage 41, 41*a* on the lower tier side with the picking station 50, and hence a lot of goods G can be carried into or out of the picking station.

Although the preferred embodiments of the present invention are described above, the present invention is not limited to the above preferred embodiments, but can be variously modified within the scope of the present invention without deviating from the spirit thereof. In particular, the plurality of preferred embodiments and variations described in this specification can be arbitrarily combined as necessary.

Picking systems according to preferred embodiments of the present invention can be applied to automated warehouses that load and unload goods between a rack and a picking station.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A picking system comprising:
a first rack including a lower tier and a plurality of upper shelf tiers to store goods;
a vertical conveyor to vertically convey the goods between the lower tier and one of the plurality of upper shelf tiers;
a shuttle carriage adjacent to one of the upper shelf tiers and operable to travel along the shelf tier to store or retrieve the goods from the shelf tier;
a picking station on or along the lower tier;
a plurality of linear motor carriages adjacent to the lower tier and operable to travel a path that is parallel or substantially parallel to that of the shuttle carriage along the lower tier so as to carry the goods into or out of the picking station;
a loop track including a first linear portion, a second linear portion, and curved portions connected between the first linear portion and the second linear portion for the linear motor carriage to travel; and
a second rack including a plurality of shelf tiers to store the goods; wherein
the lower tier among the plurality of shelf tiers of the first rack is adjacent to the first linear portion of the loop track;
the lower tier among the plurality of shelf tiers of the second rack is adjacent to the second linear portion of the loop track;
the linear motor carriage is operable to travel unidirectionally on the loop track; and the goods are placed directly on the vertical conveyor when the vertical conveyor vertically conveys the goods between the lower tier and the one of the plurality of upper shelf tiers.

2. The picking system according to claim 1, further comprising a third rack including a plurality of shelf tiers to store goods; wherein
the third rack is arranged along the first rack on the opposite side of the first linear portion; and
the third rack shares the vertical conveyor with the first rack.

3. The picking system according to claim 1, further comprising a third rack including a plurality of shelf tiers to store the goods; wherein
the lower tier among the plurality of shelf tiers of the third rack is adjacent to the loop track.

4. A picking system comprising:
a first rack including a lower tier and a plurality of upper shelf tiers to store goods;
a vertical conveyor to vertically convey the goods between the lower tier and one of the plurality of upper shelf tiers;
a shuttle carriage adjacent to one of the upper shelf tiers and operable to travel along the shelf tier to store or retrieve the goods from the shelf tier;
a picking station on or along the lower tier;
a plurality of linear motor carriages adjacent to the lower tier and operable to travel a path that is parallel or substantially parallel to that of the shuttle carriage along the lower tier so as to carry the goods into or out of the picking station;
a linear track for the linear motor carriage to travel; and
a second rack including a plurality of shelf tiers to store goods; wherein
the first rack is arranged adjacent to the linear track;

the second rack is arranged along the first rack on the opposite side of the first rack;

the second rack shares the vertical conveyor with the first rack;

the linear motor carriage is movable bidirectionally on the linear track; and the goods are placed directly on the vertical conveyor when the vertical conveyor vertically conveys the goods between the lower tier and the one of the plurality of upper shelf tiers.

* * * * *